United States Patent [19]
Nelson, Jr.

[11] Patent Number: 6,038,497
[45] Date of Patent: *Mar. 14, 2000

[54] AIRCRAFT TURN GUIDANCE SYSTEM

[75] Inventor: Robert Leonard Nelson, Jr., Austin, Tex.

[73] Assignee: Trimble Navigation Limited, Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/746,872

[22] Filed: Nov. 18, 1996

[51] Int. Cl.$^7$ .............................. G06F 17/00; G06F 7/00
[52] U.S. Cl. .............................. 701/3; 701/206; 701/13; 244/181
[58] Field of Search .............................. 701/3, 205, 210, 701/212, 206, 208, 202, 201, 214, 301, 302, 224, 13, 14; 340/988, 995; 73/178 R; 244/4 R, 158 R, 181, 185

[56] References Cited

U.S. PATENT DOCUMENTS

| | | |
|---|---|---|
| 4,354,240 | 10/1982 | Olive .............................. 701/4 |
| 4,847,769 | 7/1989 | Reeve .............................. 701/23 |
| 4,999,782 | 3/1991 | BeVan .............................. 701/206 |

OTHER PUBLICATIONS

Smiths Industries, FMCS Operational Characteristics, pp. 4–54 to 4–59.

*Primary Examiner*—William A. Cuchlinski, Jr.
*Assistant Examiner*—Gertrude Arthur
*Attorney, Agent, or Firm*—Thomas E. Schatzel; Law Offices of Thomas E. Schatzel

[57] ABSTRACT

An aircraft turn guidance system comprises a satellite navigation receiver connected to a turn path computer. Position, velocity and waypoint headings and distances are communicated from the satellite navigation receiver to the turn path computer. Roll angle, airframe and airspace constraints are fed to the turn path computer which computes a constant roll turn for the constraints when transitioning a waypoint from the inbound to outbound legs. The effects of wind on the airmass are computed in to account for real world conditions.

14 Claims, 1 Drawing Sheet

AIRCRAFT TURN GUIDANCE SYSTEM

COPYRIGHT NOTICE

A portion of the disclosure of this patent document contains material which is subject to copyright protection. In particular, Appendix A, not reproduced herein, but available in the file, is copyright © 1996 by Trimble Navigation Limited. The copyright owner has no objection to the facsimile reproduction by anyone of the patent document or the patent disclosure, as it appears in the Patent and Trademark Office patent file or records, but otherwise reserves all copyright rights whatsoever. (See, 37 C.F.R §1.71(d)–(e).)

BACKGROUND OF THE INVENTION

1. Field of the Invention

The invention relates generally to global positioning system devices and navigation receivers and more specifically to systems for guiding aircraft through turns.

2. Description of the Prior Art

An airplane's turn rate is reliably proportional to the roll angle and inversely proportional to the airspeed, turnrate=tan(roll)*g/TAS, where TAS is true airspeed and g is the acceleration of gravity, that is, 9.8 m/s$^2$. Pilots traditionally hold a constant roll angle until their airplanes reach the desired heading or course. A turn from one leg of a flight plan to the next leg is often made by an educated guess by the pilot of the roll angle and the appropriate distance from the intersection that will carry the aircraft to a tangent on the new leg. Such a turn consequently describes a segment of circle within the airmass. However the wind causes the aircraft to vector off such course at a constant speed and direction. The general result is a path over the ground that is a segment of a cycloid, or trochoid. A truly circular arc therefore can only result in the special case of no wind when the turn rate is held constant.

Conventional computerized navigation systems can continuously determine aircraft positions relative to the ground, and can therefore guide aircraft along the established airways and radials from radio-navigation aids. Such systems can also provide guidance along any arbitrary path that may be desired. But such systems make turns with simple curves that are commonly laid out as arcs of circles relative to the ground, and are not necessarily circular relative to the airmass.

In the prior art systems where wind is considered, the information is used only to find the sharpest turn radius possible that does not exceed the roll angle capability of the airplane. That part of the turn that is most nearly downwind often involves the greatest roll angles. Unless there is no wind, the consequence of using a circular model is that the roll angle must vary throughout the turn. The whole of such turns will never be as sharp as they could be if a maximum roll angle could have been maintained throughout the turning.

When plenty of airspace is available, gentler turns may be executed. But even in this case, a circular turning strategy generally requires a larger than necessary roll angle during some part of the turn.

What the prior art lacks is a capable navigation system for making guided turns that use constant roll angles. For example, to stay within limited airways and the limits of allowable roll angle, or to turn with as little roll angle as possible within the space available. Such a constant roll through a turn is needed to assure passengers who would otherwise become concerned about frequent banking changes.

SUMMARY OF THE PRESENT INVENTION

It is therefore an object of the present invention to provide an aircraft guidance system for constant roll angle turns.

It is another object of the present invention to provide an aircraft guidance system for staying within limited airways and the limits of allowable roll angle, and for turning with as little roll angle as possible within the space available.

Briefly, an aircraft guidance system embodiment of the present invention comprises a satellite navigation receiver connected to a turn path computer. A navigation system is used to guide an aircraft through its turns by following precomputed cycloidal paths. Such indirectly results in turns that are essentially constant-roll. Position, velocity and waypoint headings and distances are communicated from a satellite navigation receiver to the turn path computer. Roll angle, airframe and airspace constraints are fed to the turn path computer which computes a constant roll turn for the constraints when transitioning a waypoint from the inbound to outbound legs. The effects of wind on the airmass are computed in to account for actual conditions.

An advantage of the present invention is that an aircraft guidance system is provided for constant roll angle turns.

Another advantage of the present invention is that an aircraft guidance system is provided for staying within limited airways and the limits of allowable roll angle, and for turning with as little roll angle as possible within the space available.

These and other objects and advantages of the present invention will no doubt become obvious to those of ordinary skill in the art after having read the following detailed description of the preferred embodiment that is illustrated in the drawing figures.

IN THE DRAWINGS

FIG. 1 is block diagram of an aircraft turn guidance system embodiment of the present invention; and FIG. 2 is a flowchart of a method embodiment of the present invention used in the aircraft turn guidance system of FIG. 1.

DETAILED DESCRIPTION OF THE PREFERRED EMBODIMENT

Figure 1:
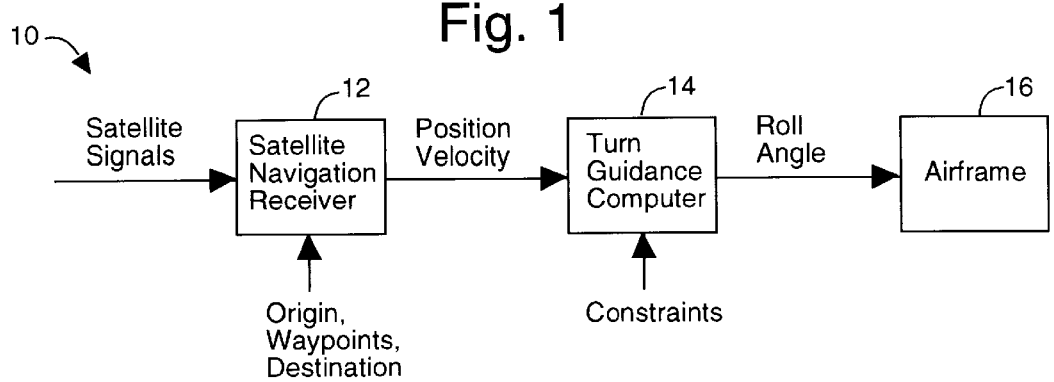

FIG. 1 illustrates a system embodiment of the present invention, referred to herein by the general reference numeral 10. A satellite navigation receiver 12 is connected to constantly receive and compute the position and velocity of an aircraft. For example, the satellite navigation receiver 12 may be of the global positioning system (GPS) or global navigation satellite system (GLONASS) types.

The present invention does not necessarily depend on the use of any particular kind of satellite navigation receiver, nor does it depend on the use of satellite navigation at all. What is required is a fairly reliable information source that provides the aircraft's position on a fairly regular basis. Other kinds of more traditional navigation equiopment can also be used. The following description related to satellite navigation receiver 12 is provided to satisfy the requirement of applicants to make a legally enabling disclosure.

Waypoints between origin and destination may be input to the satellite navigation receiver 12 and courses to steer and the distances to such waypoints are automatically provided as outputs. A turn path computer 14 uses the position and velocity updates of the satellite navigation receiver 12, together with any constraints of the airframe performance and the available airspace, to compute constant-roll angle turns when transitioning between the inbound and outbound legs of a waypoint. The path computer 14 provides signals to an airframe 16 that either automatically, or with the pilot, execute the appropriate constant-roll angle turns, given any predetermined constraints.

The path computer 14 preferably includes an application program to compute the requirements of a constant-roll turn from information provided from various sources about the roll angle, airspeed, the directions to and from an intersection, and the speed any direction of any wind. The inbound and outbound courses for the intersection are converted to inbound and outbound headings, e.g., using the wind's crosswind component. The ratio of the crosswind to the airspeed is related to the sine of the difference between the course and the heading, which is the crab angle. The turn direction and the difference between the inbound and outbound headings is used to find the whole angle the aircraft must turn, and the turn angle proportionally foretells the time it will take to execute such a turn. The length of the chord to be traveled is found by forming the vector sum of the motion due to airspeed and wind. The wind motion is simply the wind vector multiplied by the turn time. The airspeed motion is the difference between the radius vectors of the aircraft relative to the airmass through the turn. Each radius vector is perpendicular to the heading vector and has a length equal to the turn radius.

The chord may be explicitly computed from the allowable roll and then located between the two legs using elementary geometry. The vector direction does not, however, depend on roll because the two components of the total motion vector are each inversely proportional to the tangent of the roll angle. Alternatively, the chord is computed using an arbitrary roll, e.g., 45°. A turn is begun or ended at any desired point on either inbound or outbound leg, taking into account any space constraints. Only the chord direction is then used to find where the other end of the chord of the actual turn would be placed. The tangent of the resulting roll is computed by dividing the length of the chord constructed by the length of the chord which results from a 45° roll angle. The roll angle and radius are computed from this and the turn is plotted with geometry. Where enough turning room is available, an intermediate roll angle is chosen that lies between the shallowest turn that will fit and the sharpest turn that is limited by the roll limit.

Figure 2:
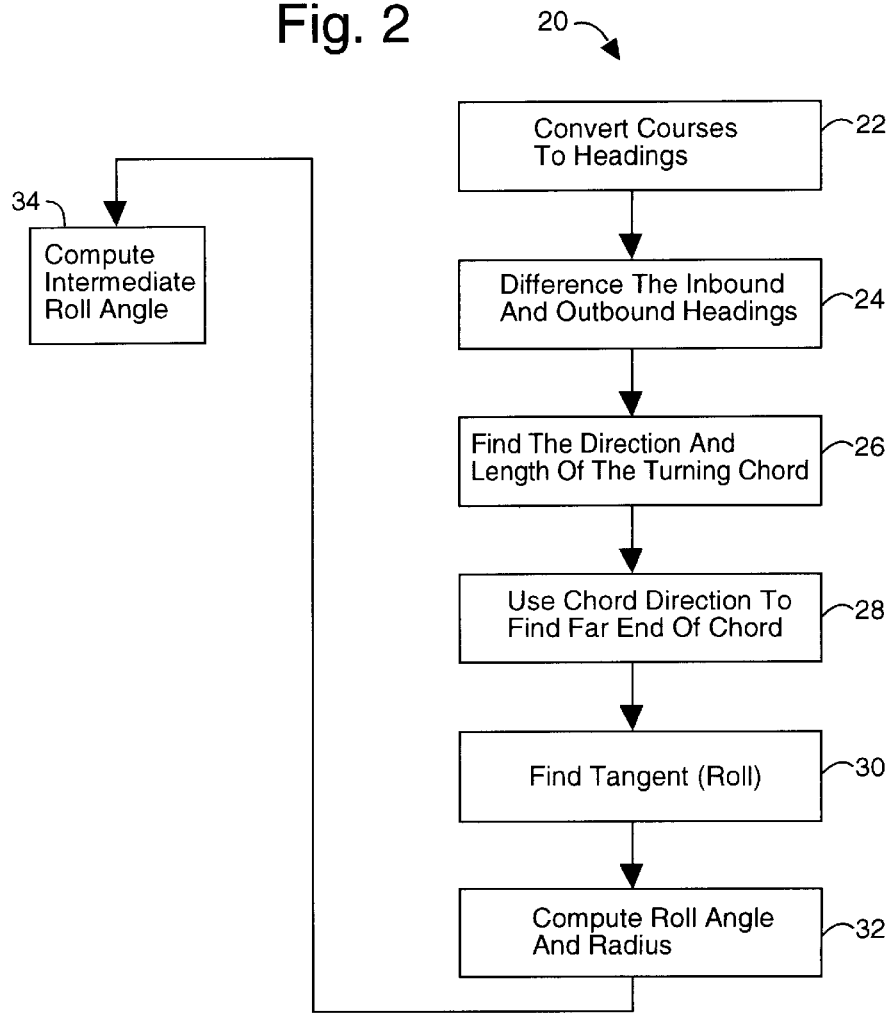

FIG. 2 illustrates a method embodiment of the present invention, referred to herein by the general reference numeral 20. The method 20 computes a constant-roll angle turn, given the present and permissible roll angles (tan(roll)), the true airspeed (TAS), the directions to be flown inbound and outbound of the waypoint, and the speed and direction of the wind. The method 20 takes special advantage of the fact that the chord direction of a constant-roll angle turn is independent of the roll angle.

In a step 22, the inbound and outbound courses are converted to inbound and outbound headings by finding the wind's crosswind component. The difference between the course and the heading, e.g., the "crab" angle, is the arc-sine of the ratio of the crosswind to the airspeed. The outbound and inbound headings are differenced in a step 24, taking into account the turn direction to get the total angle through that the aircraft heading will turn. The turn time is proportional to this angle, e.g., turntime=turnangle*TAS/[tan(roll)*g].

In a step 26, the direction and length of the chord for the turning arc between inbound and outbound legs is found by forming the vector sum of the motion due to airspeed and the motion due to wind. The motion due to wind is simply the wind vector multiplied by the turn time. The motion due to airspeed is the difference between the radius vectors of the aircraft relative to the airmass at the end and at the beginning of the turn. Each of these radius vectors is a vector perpendicular to the heading vector and of length equal to the turn radius "r". Mathematically expressed as, r=TAS*TAS/[tan(roll)*g]. The two components of the total motion vector are each inversely proportional to the tangent of the roll angle. So the direction of the vector does not depend on the roll angle. The chord is computed explicitly from the allowable roll angle and located between the two legs by elementary geometry. The computation of a chord may also be based on an arbitrary roll angle, e.g., forty-five degrees, which has a tangent of one.

The method 20 is able to begin and end a turn at any desired point on either leg, according to whatever space constraints are applicable. In a step 28, only the chord direction is used to find the other end of the chord of the actual turn to be flown. A step 30 finds the tangent of the resulting roll angle by dividing the length of the constructed chord by the length of the chord that resulted from using a roll angle of forty-five degrees. From this, it computes the roll angle and the radius, and lays out the turn using elementary geometry in a step 32.

When ample room is available for a turn, the method 20 may also include a step 34 to use a roll angle intermediate to the gentlest turn that will fit and the sharpest that a roll angle limit constraint would allow. For example, the geometric mean of the chord lengths of these two extremes may be used, and also the geometric means of the radii, turn times, and roll angle tangents. This is beneficial for small turn angles in that both the turn anticipation distance and the roll angle will approach zero.

In general, the flight paths through turns are completely computed start-to-finish before the turn is initiated, and then the execution of the turn by the airframe is done according to the precomputed course. Thus the greatest part of any bank is done only once, and only fine adjustments are made through the progress of a turn by either the pilot or autopilot or both, to compensate for the effects of wind variations and operating system noise. Such steering commands can be input automatically to an autopilot or followed manually by a pilot from instructions presented on a display.

Appendix A, not reproduced herein but available in the file, is an exemplary source code listing for a particular implementation of the present invention that was tested. No doubt other software approaches could be taken. The listing is provided merely to unquestionably meet the requirements of an enabling disclosure. Such source code includes, in part, a procedure for limiting the roll angle according to an appropriate steering law, e.g., to compute the roll angle command that will steer the aircraft through a cycloidal turn and to flag if still turning. The turn heading vector is computed, as in pseudocode, turnhdg$=cart(1, hdgin+dhdg*tp/turntime). To find the turn velocity, e.g., the turn position's partial derivative with respect to the turn parameter and the negative of the partial derivative of aircraft position relative to turn position, turnv$=sum(prod(TAS, turnhdg$)+wind$). The turn ground speed, e.g., the turn velocity's magnitude is estimated by turnGS=(turnGS+magsq(turnv$)/turnGS)/2. The turn time scale is recomputed, which is the turn parameter's rate of change relative to the simulated time, or the ratio of the aircraft ground speed to the turn ground speed, as in timescale=GS/turnGS. To find the turn's moving center, turnc$=sum (initc$+prod(tp, wind$)). To find the aircraft position relative to the turn position, pq$=sum(p$+neg(turnc$)+prod(bank%*turnr, rot(turnhdg$))). The along-track unit vector is computed by normalizing the turn velocity vector and using that to find the crosstrack distance and track-angle error, as in, along$=prod(1/turnGS, turnv$) XTD=dot(pq$, rot(along$)) TAE=atan2(anglediff(v$, along$)). The cross-track distance is biased to anticipate the roll angle needed to accelerate the aircraft sideways, e.g., using the so-called "ARINC" steering law, so that there need be no cross-track distance to develop it otherwise. If the simulated aircraft airspeed and wind equal the turn airspeed and wind, the only acceleration "g" is due to the circular component of motion around the turn center, always toward the moving center, accel=bank%*TAS2/turnr. Because the same paths are generally followed at different speeds, the centripetal acceleration is scaled by the square of the time scale, but not so as to change its direction, accel=accel*timescale*timescale. If the simulated airspeed and wind differ from the turn airspeed and wind, the time scale generally varies during the turn, even when the airspeed and wind are themselves constant. Any time-scale variation, causes an acceleration component, but in the along-track direction only. The centripetal acceleration, being generally not perpendicular to the path, also has an along-track component. These along-track accelerations can be ignored for the purpose of keeping the aircraft on the path. The cross-track component of anticipated centripetal acceleration is found that is proportional to the cosine of the difference between the turn heading and the along-track direction, accel=accel*dot(along$, turnhdg$). Such anticipated cross-track acceleration must be generated by an aircraft whose heading is not generally in the along-track direction. The aircraft's anticipated acceleration perpendicular to its own axis is increased by a factor of the difference's secant, as in pseudocode, accel=accel*TAS/dot(av$, along$) biasedXTD=XTD−qatan(accel/g)*ft/(0.00281*deg). The biased crosstrack distance is limited to produce a 90-degree intercept, limitedXTD=lesser (0.002*90*GS/0.00281, ABS(biasedXTD)) limitedXTD= SGN(biasedXTD)*limitedXTD rollcmd=ARINC (limitedXTD, TAE). The turn position is maintained in step with the aircraft position by requiring that the turn velocity's dot product with corrected aircraft-to-turn relative position be zero, that is, that dot(turnv$, pq$−turnv$*dtp)=0. This equation is solved for the correction to the turn parameter, dtp=dot(pq$, turnv$)/magsq(turnv$). The turn is stopped when turn-parameter corrections exceed dt/2, IF t>dt AND ABS(dtp)>dt/2 THEN turning%=false.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An aircraft turn guidance system for guiding an airplane through a moving airmass along a generally non-circular path over the ground that will produce a constant-roll turn in the presence of a substantial anticipated wind, comprising:

a navigation system that provides for position, velocity, and waypoint heading and distance information of an airplane through a moving airmass; and a path computer connected to the navigation system and including further inputs to accept roll angle, airframe and airspace constraint information of said airplane;

wherein the path computer computes a constant-roll-turn solution for piloting said airplane that is circular relative to the airmass but not circular to the ground when transitioning between waypoints from inbound to outbound legs in the presence of a substantial wind that is moving said airmass relative to the ground; and wherein any error predicted to be previously caused by wind is included a computed solution for said constant-roll-turn solution.

2. The system of claim 1, wherein said turn path computer further comprises:

a pilot information display connected to the path computer and providing for the communication of a course to follow based on said constant-roll-turn solution.

3. The system of claim 1, wherein said turn path computer further comprises:

a control system interface providing for a connection between the path computer and an autopilot such that information is provided to said autopilot about said course to follow based on said constant-roll-turn solution.

4. The system of claim 1, wherein said turn path computer further comprises:

a pilot information display connected to the path computer and providing for the communication of a course to follow based on said constant-roll-turn solution; and a control system interface providing for a connection between the path computer and an autopilot such that information is provided to said autopilot about said course to follow based on said constant-roll-turn solution.

5. The system of claim 1, wherein said turn path computer further comprises:

means for converting inbound and outbound courses for an aircraft to inbound and outbound headings to find a crab angle;

means for differencing said headings to find a turn angle and turn time;

means for finding the direction and the length of a turning chord to suit said turn angle and turn time;

means for determining the tangent of a resulting roll angle by dividing the length of a constructed chord by the length of said turning chord using a roll angle of forty-five degrees; and means for computing a roll angle and a turn radius that fit said inbound and outbound courses for said aircraft.

6. A method for guiding aircraft through turns, the method comprising:

converting inbound and outbound courses for an aircraft to inbound and outbound headings to find a crab angle;

differencing said headings to find a turn angle and turn time;

finding the direction and the length of a turning chord to suit said turn angle and turn time;

determining the tangent of a resulting roll angle by dividing the length of a constructed chord by the length of said turning chord using a roll angle of forty-five degrees; and computing a roll angle and a turn radius that fit said inbound and outbound courses for said aircraft.

7. The method of claim 6, wherein:

the step of computing determines a constant-roll angle turn, given a present and a permissible roll angle (tan(roll)), the true airspeed (TAS), the directions to be flown inbound and outbound of a waypoint, and the speed and direction of the wind, and wherein the chord direction of a constant-roll angle turn is independent of said roll angle.

8. The method of claim 6, wherein:

the differencing is such that said outbound and inbound headings are differenced taking into account the turn direction to get the total angle through which the aircraft heading will turn, and wherein said turn time is proportional to such angle, as in, turntime= turnangle*TAS/[tan(roll)*g].

9. The method of claim 6, wherein:

the step of finding is such that a direction and length of a chord for a turning arc between inbound and outbound legs is found by forming a vector sum of a motion due to airspeed and a motion due to wind, wherein said motion due to wind is the wind vector multiplied by the turn time, and said motion due to airspeed is the difference between the radius vectors of the aircraft relative to the airmass at the end and at the beginning of the turn, and each of these radius vectors is a vector perpendicular to the heading vector and of length equal to the turn radius "r", mathematically expressed as, r=TAS*TAS/[tan(roll)*g].

10. The method of claim 6, wherein:

the step of finding is such that the two components of the total motion vector are each inversely proportional to the tangent of the roll angle, and the direction of the vector does not depend on the roll angle, and said chord is computed explicitly from the allowable roll angle and located between said inbound and outbound legs.

11. The method of claim 10, wherein:

the step of finding is such that the computation of said chord length and direction are based on an arbitrary roll angle.

12. The method of claim 6, further comprising the step of:

determining a roll angle intermediate to the gentlest turn and the sharpest turn that a roll angle limit constraint would allow.

13. The method of claim 12, wherein:

the step of determining said intermediate roll angle includes using the geometric mean of the chord lengths of said gentlest turn and said sharpest turn.

14. The method of claim 12, wherein:

the step of determining said intermediate roll uses the geometric means of the radii, turn times, and roll angle tangents, wherein for small turn angles both a turn anticipation distance and said roll angle will approach zero.

* * * * *